US008100229B2

(12) United States Patent
Matsubara et al.

(10) Patent No.: US 8,100,229 B2
(45) Date of Patent: Jan. 24, 2012

(54) OIL FLOW PASSAGE ARRANGEMENT OF AUTOMATIC TRANSMISSION

(75) Inventors: Kenji Matsubara, Kanagawa (JP); Hiromi Taguchi, Kanagawa (JP); Yasuhiko Kunii, Kanagawa (JP); Tsutomu Saitou, Kanagawa (JP); Tomoyuki Watanabe, Tokyo (JP)

(73) Assignee: Jatco Ltd, Fuji-shi (JP)

( * ) Notice: Subject to any disclaimer, the term of this patent is extended or adjusted under 35 U.S.C. 154(b) by 1065 days.

(21) Appl. No.: 11/086,405

(22) Filed: Mar. 23, 2005

(65) Prior Publication Data
US 2005/0217938 A1  Oct. 6, 2005

(30) Foreign Application Priority Data
Mar. 31, 2004  (JP) ................................ 2004-105757

(51) Int. Cl.
F16C 3/14  (2006.01)
F01M 1/04  (2006.01)

(52) U.S. Cl. ........... 184/1.5; 184/6.5; 184/6.6; 184/6.7; 184/6.8; 184/6.9; 184/6.12; 184/7.2; 475/60; 123/90.33

(58) Field of Classification Search .................. 184/1.5, 184/6.5–6.9, 6.12, 7.2; 74/606 A; 475/60; 123/90.33; 285/124.2, 124.3, 124.4
See application file for complete search history.

(56) References Cited

U.S. PATENT DOCUMENTS

| | | | | | |
|---|---|---|---|---|---|
| 1,429,466 A | * | 9/1922 | Turnbull | ...................... | 184/6.12 |
| 1,684,955 A | * | 9/1928 | Goodwin | ........................ | 184/6.9 |
| 1,687,780 A | * | 10/1928 | Neale | .............................. | 138/40 |
| 1,975,920 A | * | 10/1934 | Bijur | ................................ | 184/7.3 |
| 4,141,434 A | * | 2/1979 | Williams | ...................... | 184/6.12 |
| 4,621,710 A | * | 11/1986 | Tsukamoto et al. | ......... | 184/6.27 |
| 4,729,349 A | * | 3/1988 | Sonoda et al. | ............. | 123/90.34 |

FOREIGN PATENT DOCUMENTS

| | | |
|---|---|---|
| JP | 8-303560 A | 11/1996 |
| JP | 10-205609 A | 8/1998 |

* cited by examiner

*Primary Examiner* — Bradley King
*Assistant Examiner* — Mahbubur Rashid
(74) *Attorney, Agent, or Firm* — Foley & Lardner LLP

(57) ABSTRACT

First and second oil flow passages are defined in a wall portion of a transmission casing. The first oil flow passage has an open end exposed to an interior of the casing. The second oil passage is connected to the first oil passage through a connection opening defined by the first oil passage. A separate pipe member has a predetermined end portion that is inserted into the first oil passage from the open end of the same. The predetermined end portion comprises a cylindrical portion having a fixed length; an end opening defined by an end of the cylindrical portion and exposed to the first oil passage; and an orifice opening defined by a side wall of the cylindrical portion. The orifice opening is blocked by an inner wall of the first oil passage when the connection opening takes a first position relative to the open end of the first oil passage, and exposed to the second oil passage when the connection opening takes a second position relative to the open end of the first oil passage. The second position is closer to the open end of the first oil passage than the first position is.

8 Claims, 3 Drawing Sheets

OIL FLOW PASSAGE ARRANGEMENT OF AUTOMATIC TRANSMISSION

BACKGROUND OF THE INVENTION

1. Field of the Invention

The present invention relates in general to an automotive transmission and more particularly to an oil flow passage arrangement that feeds a given part of the transmission with a lubricating oil or a hydraulic fluid.

2. Description of the Related Art

In order to clarify the present invention, known oil flow passage arrangements of an automatic transmission will be described briefly in the following, which are disclosed in Japanese Laid-open Patent Applications (Tokkaihei) 10-205609 and 8-303560.

The oil flow passage arrangements disclosed in the published applications are of a type that comprises generally an oil flow passage that is defined in a casing of the transmission and an oil flow passage that is defined in a separate pipe member that is connected to the oil flow passage of the casing. In the oil flow passage arrangement of the published application 10-205609, the separate pipe member has a leading end that is located near a moving part (viz., a transmission belt of belt-type continuously variable transmission) and equipped with a nozzle (or orifice). Under operation of the transmission, a pressurized lubricating oil is ejected from the nozzle to the moving part to lubricate the same. In the oil flow passage arrangement of the other published application 8-303560, the separate pipe member has one end portion that is actually received in the oil flow passage defined in the transmission casing. The end portion of the pipe member is formed with an orifice through which a pressurized lubricating oil is led into the oil flow passage of the casing and ejected to moving parts (viz., bearings) through respective branch passages.

SUMMARY OF THE INVENTION

In the above-mentioned oil flow passage arrangements, the pipe member that defines therein another oil flow passage serves also as an orifice member. Thus, there is no need of preparing a separate orifice member (such as an orifice plug or the like) that is to be connected to the pipe member.

However, in the measures of the above-mentioned publications, a so-called common applicability of the separate pipe member is given little thought in the field of oil flow passage arrangement of the automatic transmissions. If, in such measures, a different size of orifice is needed, it becomes necessary to prepare a different pipe member that has an orifice of such size. That is, different pipe members have to be prepared for every different size of orifices that are needed.

It is therefore an object of the present invention to provide an oil flow passage arrangement of an automatic transmission wherein a separate pipe member used therein has a common applicability.

That is, in accordance with the present invention, there is provided an oil flow passage arrangement of an automatic transmission wherein a separate pipe member that constitutes a part of the arrangement is applicable to two types of automatic transmissions.

In accordance with a first aspect of the present invention, there is provided an oil flow passage arrangement of a transmission, which comprises a first oil passage defined in a wall portion of a casing of the transmission, the first oil passage having an open end that is exposed to the outside with respect to the wall portion of the casing; a second oil passage defined in the wall portion of the casing, the second oil passage being connected to the first oil passage through a connection opening defined by the first oil passage; a separate pipe member having a third oil passage defined therein, the separate pipe member having a predetermined end portion that is inserted into the first oil passage from the open end of the first oil passage, wherein the predetermined end portion of the separate pipe member comprises a cylindrical portion having a fixed length; an end opening defined by an end of the cylindrical portion and exposed to the first oil passage; and an orifice opening defined by a side wall of the cylindrical portion, the orifice opening being blocked by an inner wall of the first oil passage when the connection opening takes a first position relative to the open end of the first oil passage and exposed to the second oil passage when the connection opening takes a second position relative to the open end of the first oil passage, the second position being closer to the open end of the first oil passage than the first position is.

In accordance with a second aspect of the present invention, there is provided an oil flow passage arrangement of an automatic transmission, which comprises a first oil passage defined in a wall portion of a casing of the transmission, the first oil passage having an open end that is exposed to an interior of the casing, the first oil passage being connected to an oil pump to be fed with a pressurized lubricating oil; a second oil passage defined in the wall portion of the transmission casing, the second oil passage being connected to the first oil passage through a connection opening defined by the first oil passage, the second oil passage being led to an area where a moving part to be lubricated is located; a separate pipe member having a third oil passage defined therein, the separate pipe member having a predetermined end portion that is inserted into the first oil passage from the open end of the first oil passage, the separate pipe member having the other end portion that extends to an area where another moving part to be lubricated is located, wherein the predetermined end portion of the separate pipe member comprises a cylindrical portion that is intimately received in the first oil passage; an end opening defined by an end of the cylindrical portion and coaxially exposed to an interior of the first oil passage; and an orifice opening defined by a side wall of the cylindrical portion, the orifice opening being blocked by an inner wall of the first oil passage when the connection opening takes a first position relative to the open end of the first oil passage but exposed to the second oil passage when the connection opening takes a second position relative to the open end of the first oil passage, the second position being closer to the open end of the first oil passage than the first position is.

In accordance with a third aspect of the present invention, there is provided a separated pipe member for use in an oil flow passage arrangement of a transmission, the arrangement including a first oil passage defined in a wall portion of a casing of the transmission, the first oil passage having an open end that is exposed to an interior of the transmission casing; and a second oil passage defined in the wall portion of the transmission casing, the second oil passage being connected to the first oil passage through a connection opening defined by the first oil passage. The separate pipe member has a third oil passage defined therein and has a predetermined end portion that is inserted into the first oil passage from the open end of the first oil passage. The predetermined end portion comprises a cylindrical portion having a fixed length; an end opening defined by an end of the cylindrical portion and exposed to the first oil passage; and an orifice opening defined by a side wall of the cylindrical portion, the orifice opening being blocked by an inner wall of the first oil passage when the connection opening takes a first position relative to the open end of the first oil passage, and exposed to the second oil passage when the connection opening takes a second position relative to the open end of the first oil passage, the second position being closer to the open end of the first oil passage than the first position is.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

In the following, first and second embodiments 100 and 200 of the present invention will be described with reference to the accompanying drawings.

For ease of understanding, various directional terms, such as, right, left, upper, lower, rightward and the like will be used in the following description. However, such terms are to be understood with respect to only a drawing or drawings on which corresponding part or portion is illustrated.

Figure 1:
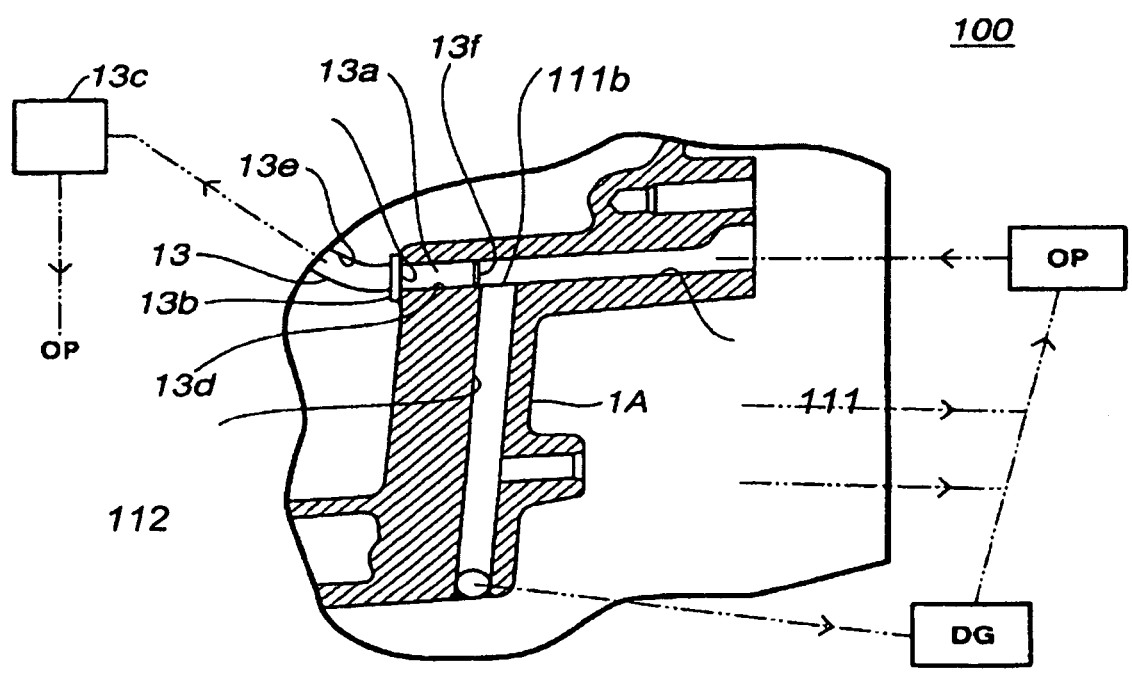
FIG. 1 is a vertically sectional view of an oil flow passage arrangement of a first embodiment of the present invention.
Figure 3:
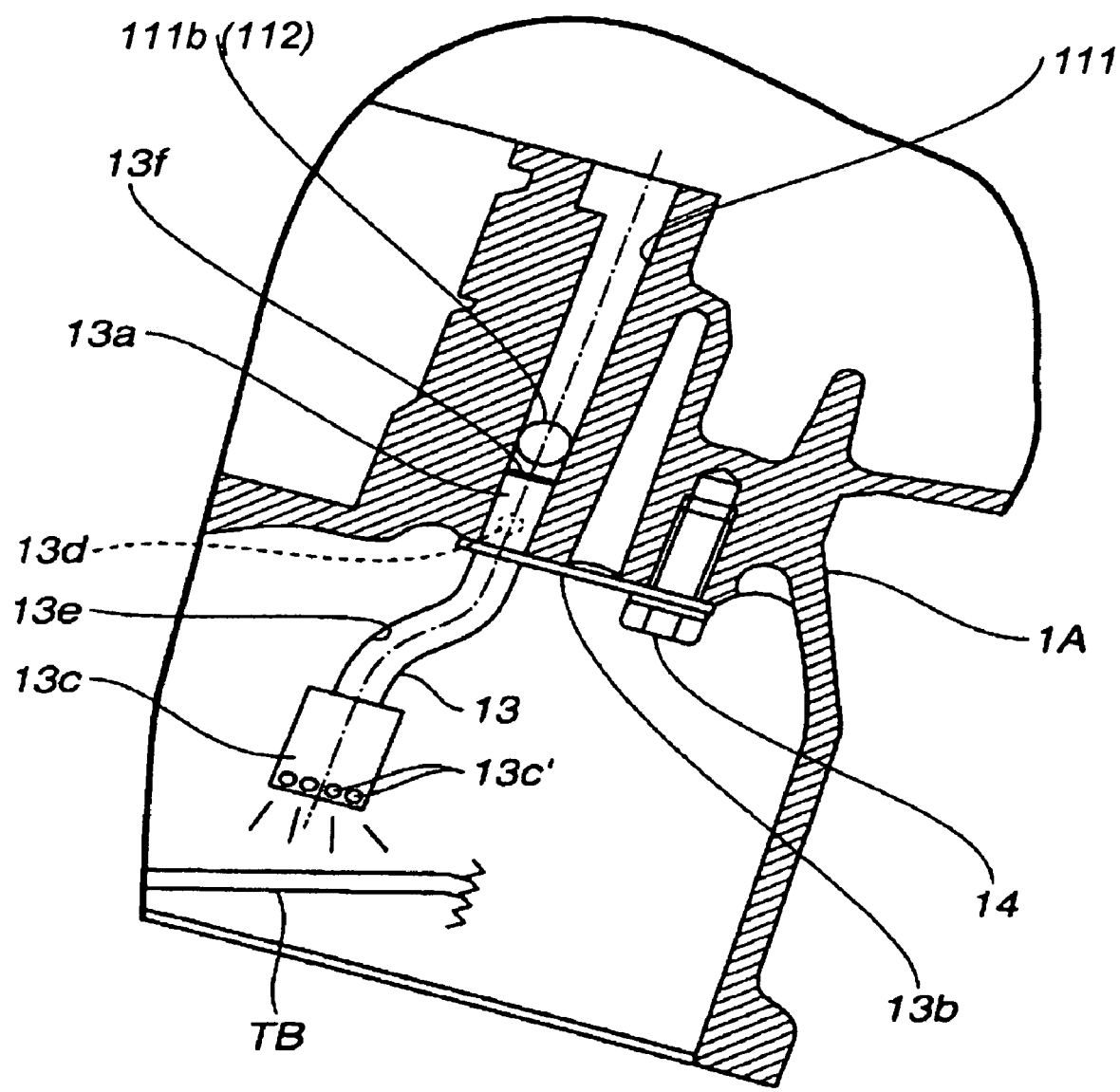
FIG. 3 is a horizontally sectional view of the oil flow passage arrangement of the first embodiment of the present invention.

Referring to FIGS. 1 and 3, particularly FIG. 1, there is shown in a vertically sectional manner an oil flow passage arrangement 100 which is a first embodiment of the present invention.

In this first embodiment 100, the oil flow passage arrangement is applied to a first type automatic transmission. This type transmission may be a belt type continuously variable transmission (viz., belt-type CVT).

In FIGS. 1 and 3, denoted by numeral 1A is a casing of the first type automatic transmission.

Although not shown in the drawings, in the transmission casing 1A, there are arranged or installed various moving parts of the transmission, which are to be lubricated by an lubricating oil. In case of the belt type continuously variable transmission, drive and driven pulleys are arranged and a transmission belt "TB" (see FIG. 3) is put around the drive and driven pulleys. Usually, the drive pulley is connected to an output shaft of an engine through a torque converter and the driven pulley is connected to drive road wheels through a differential gear "DG" (see FIG. 1).

As shown in FIG. 1, an oil flow passage arrangement 100 of the first embodiment comprises generally first and second oil flow passages 111 and 112 that are defined in a wall portion of the transmission casing 1A and a third oil flow passage 13e that is defined in a separate pipe member 13.

It is to be noted that the separate pipe member 13 is arranged in an interior of the transmission casing 1A. As will become apparent as the description proceeds, the oil flow passage arrangement 100 can serve to feed both the transmission belt "TB" and the differential gear "DG" with a sufficient amount of lubricating oil for lubricating the same.

As shown in FIG. 1, the first oil passage 111 has a left open end 111a that is exposed to the interior of the transmission casing 1A. That is, the left open end 111a terminates at an inner surface of the wall portion of the transmission casing 1A. In other words, the left open end 111a is exposed to the outside with respect to the wall portion of the casing 1A.

A pressurized lubricating oil is fed to the first oil passage 111 from an oil pump "OP" that is usually driven by an output member of the torque converter. The first oil passage 111 has, at a position distant from the left open end 111a thereof, a connection opening 111b from which the second oil passage 112 extends downward. Although not shown in the drawing, the second oil passage 112 has branch passages through which the pressurized lubricating oil from the oil pump "OP" is fed to the differential gear "DG" as well as other moving parts. The lubricating oil applied to the differential gear "DG" and the moving parts is then returned back to the oil pump "OP", as is briefly schematically shown in the drawing.

The pipe member 13 has a right end portion (or predetermined end portion) 13a as viewed in FIG. 1, that is cylindrical and tightly inserted in the left open end 111a of the first oil passage 111 of the wall portion of the transmission casing 1A. The right end portion 13a has a predetermined length. For assuring a proper insertion of the right end portion 13a into the left open end 111a, the pipe member 13 is formed with a flange 13b which abuts on an inner surface of the wall portion of the transmission casing 1A.

As is seen from FIG. 3, the flange 13b has a radially extending part that is secured to the wall portion of the transmission casing 1A by means of threaded bolts 14. As is shown in this drawing, the pipe member 13 has the other end to which a nozzle member 13c is connected. As shown, the nozzle member 13c is installed in the interior of the transmission casing 1A and formed with a plurality of small openings 13c' from which the pressurized lubricating oil from the oil pump "OP" is ejected toward the transmission belt "TB" for lubricating the same.

It is now to be noted that in the present invention, the right end portion 13a of the pipe member 13 is formed at a cylindrical side wall thereof with an orifice opening 13d. The size of the orifice opening 13d is quite small as compared with that of the connection opening 111b of the first oil passage 111, for the reason which will become apparent hereinafter.

As is understood from FIG. 1, when, in the first embodiment 100, the pipe member 13 is properly connected to the first oil flow passage 111, the orifice opening 13d of the pipe member 13 is blocked or covered by a cylindrical inner wall of the first oil passage 111. That is, in this case, the orifice opening 13d is dead, and thus, the pressurized lubricating oil from the oil pump "OP" is led into the pipe member 13 from a right end opening 13f of the pipe member 13, and at the same time, the pressurized lubricating oil from the oil pump "OP" is led into the second oil passage 112 from the connection opening 111b. Thus, in this case, both the transmission belt "TB" and the differential gear "DG" are fed with a sufficient amount of lubricating oil under operation of the transmission, that is, under movement of an associated motor vehicle.

Figure 2:
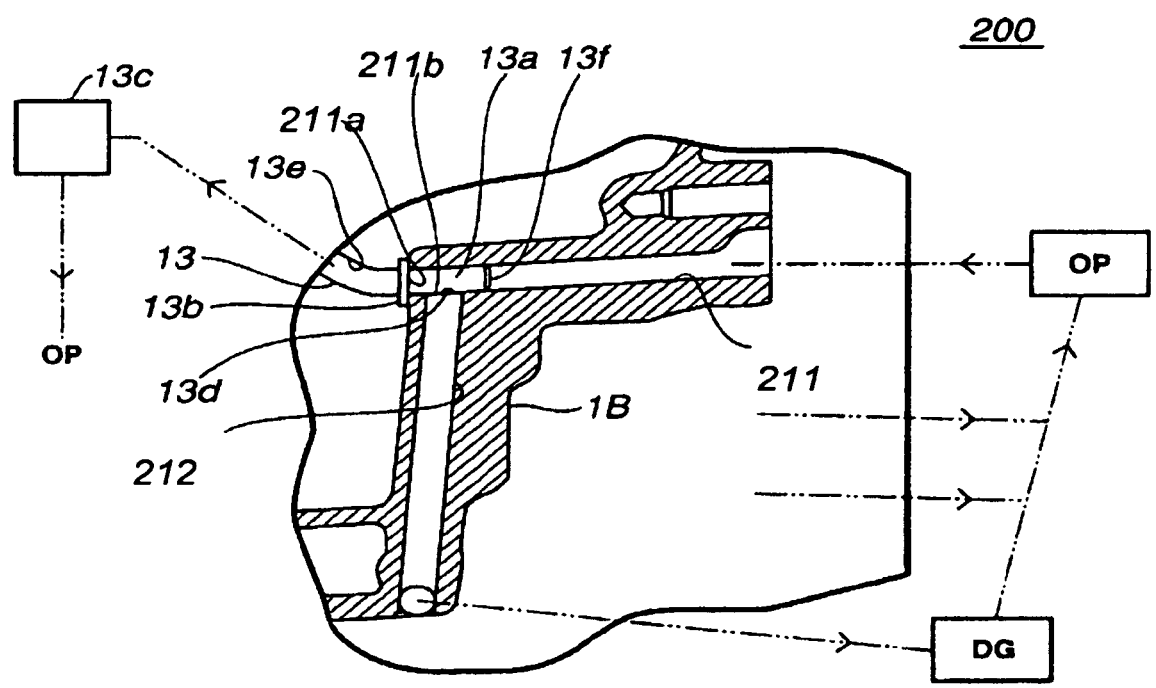
FIG. 2 is a view similar to FIG. 1, but showing a second embodiment of the present invention.

Referring to FIG. 2, there is shown an oil flow passage arrangement 200 which is a second embodiment of the present invention.

In this second embodiment 200, the oil flow passage arrangement is applied to a second type automatic transmission. This type transmission may be also a belt type continuously variable transmission (viz., belt-type CVT).

Since the arrangement of the second embodiment 200 is similar to that of the above-mentioned first embodiment 100, only portions or parts that are different from those of the first embodiment 100 will be described in detail in the following.

It is to be noted that the pipe member 13 used in this second embodiment 200 is the completely same as the pipe member 13 used in the first embodiment 100.

As will be easily understood from FIG. 2, the second type automatic transmission to which the oil flow passage arrangement of the second embodiment 200 is applied has a transmission casing 1B that is different from the transmission casing 1A of the above-mentioned first type automatic transmission. That is, as is apparent when comparing FIGS. 3 and 1, in the transmission casing 1B, the second oil passage 212 is positioned much closer to the inner surface of the wall portion of the casing 1B than that in the transmission casing 1A.

Thus, when the pipe member 13 is properly connected to the left open end 211a of the first oil passage 211 the right end portion 13a of the pipe member 13 blocks or covers the connection opening 211b of the first oil passage 211 having only the orifice opening 13d thereof exposed to the connection opening 211b of the first oil passage 211. That is, as is understood from the drawing, in this second embodiment 200, the fluid connection between the first and second oil passages 211 and 212 is achieved by only the orifice opening 13d. In this case, the orifice opening 13d is alive serving as a fluid flow restricting means. More specifically, in this second embodiment 200, the amount of the lubricating oil fed to the differential gear "DG" and the surrounding moving parts is reduced as compared with the case of the above-mentioned first embodiment 100.

As will be understood from the foregoing description, the pipe member 13 that constitutes a part of the oil flow passage arrangement is applicable to both the casing 1A of the first type automatic transmission and the casing 1B of the second type automatic transmission. That is, a common applicability of the pipe member 13 is carried out in the field of oil flow passage arrangement of the automatic transmissions. As is easily understood, the common applicability of the pipe member brings about easiness and reduced cost with which an oil flow passage arrangement can be constructed in the automatic transmission.

Although the foregoing description is directed to the two embodiments 100 and 200 in which the pipe member 13 is connected to the inside end of the first oil flow passage 111, 211, such pipe member 13 may be connected to an outside end of the first oil passage 111, 211 from the outside of the transmission casing 1A or 1B if, for example, the nozzle member 13c is arranged outside of the transmission casing 1A or 1B.

The entire contents of Japanese Patent Application 2004-105757 (filed Mar. 31, 2004) are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. An oil flow passage arrangement for use in a transmission, comprising:
   a first oil passage, in a wall portion of the transmission, including an open end that is exposed to the outside of the wall portion;
   a second oil passage, in the wall portion, connected to the first oil passage through a connection opening of the first oil passage;
   a pipe member that includes a third oil passage and an end portion positioned in the open end of the first oil passages,
   wherein the end portion of the pipe member includes:
   a cylindrical portion;
   an end opening formed in an end of the cylindrical portion, the end opening connected to the first oil passage; and
   an orifice opening formed in a side wall of the cylindrical portion, the orifice opening configured to be closed by an inner wall of the first oil passage.

2. The oil flow passage arrangement as claimed in claim 1, wherein a sectional area of the orifice opening is smaller than that of the end opening of the third oil passage.

3. The oil flow passage arrangement as claimed in claim 2, wherein the first oil passage is connected to an oil pump to be fed with a pressurized lubricating oil.

4. The oil flow passage arrangement as claimed in claim 3, further comprising a nozzle member connected to an end portion of the third oil passage for ejecting therefrom the pressurized lubricating oil toward a first moving part installed in the transmission.

5. The oil flow passage arrangement as claimed in claim 4, wherein the second oil passage is connected to an area where a second moving part is arranged, so that the pressurized lubricating oil is applicable to the second moving part.

6. The oil flow passage arrangement as claimed in claim 5, wherein the transmission is a continuously variable transmission and the first moving part is a belt and the second moving part is a differential gear of an associated motor vehicle.

7. The oil flow passage arrangement as claimed in claim 6, wherein the pipe member is equipped with a flange that is connected to the transmission through bolts.

8. A method of manufacturing a transmission, comprising the steps of:
   providing a first transmission and a second transmission each having an oil flow passage arrangement, wherein the oil flow passage arrangement includes a first oil passage formed in a wall portion of each transmission that includes an open end exposed to an outside of the wall portion, a second oil passage formed in the wall portion of each transmission connected to the first oil passage through a connection opening provided in the first oil passage and a third oil passage including one end portion insertable into the first oil passage from the open end, wherein a first length of the first oil passage between the open end and the connection opening of the first transmission differs from a second length of the first oil passage between the open end and the connection opening of the second transmission;
   providing a pipe member adapted to fit in the third oil passage of either the first transmission or the second transmission, the pipe member comprising:
   a cylindrical portion;
   an end opening formed in an end of the cylindrical portion, the end opening being exposed to the first oil passage when the end portion of the third oil passage is inserted into the first oil passage from the open end; and
   an orifice opening formed in a side wall of the cylindrical portion, the orifice opening closed by an inner wall of the first oil passage when the end portion of the third oil passage is inserted into the first oil passage of the first transmission and exposed to the connection opening of the first oil passage when the end portion of the third oil passage is inserted into the first oil passage of the second transmission; and
   selectively fitting the pipe member to the first transmission or the second transmission.

* * * * *